US012723630B2

(12) United States Patent
Jones et al.

(10) Patent No.: US 12,723,630 B2
(45) Date of Patent: Sep. 1, 2026

(54) NO-BACK BRAKE HAVING A LIMITED AUTHORITY DAMPER

(71) Applicant: THE BOEING COMPANY, Arlington, VA (US)

(72) Inventors: Zachary M. Jones, Saint Peters, MO (US); Mark John Gardner, Snohomish, WA (US); Geya Kairamkonda, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 343 days.

(21) Appl. No.: 18/460,831

(22) Filed: Sep. 5, 2023

(65) Prior Publication Data

US 2025/0075754 A1 Mar. 6, 2025

(51) Int. Cl.
*F16D 65/00* (2006.01)
*B64C 13/28* (2006.01)
*F16D 55/14* (2006.01)

(52) U.S. Cl.
CPC .......... *F16D 65/0018* (2013.01); *B64C 13/28* (2013.01); *F16D 55/14* (2013.01)

(58) Field of Classification Search
CPC ...... F16D 67/02; F16D 67/00; F16D 2125/38; F16D 55/38; F16D 55/36; F16D 43/216; F16D 3/50; F16D 43/2024; F16D 51/04
See application file for complete search history.

(56) References Cited

U.S. PATENT DOCUMENTS 5,944,148 A 8/1999 Bae
8,978,840 B2 * 3/2015 Lang .................... F16D 65/186 188/134
11,440,640 B2 9/2022 Bae
11,603,079 B2 3/2023 Gaile
2014/0138482 A1 * 5/2014 Lang ...................... F16D 55/38 244/99.9
2020/0189723 A1 * 6/2020 Bae ........................ B64C 13/28
2020/0377063 A1 12/2020 Gaile
2022/0212781 A1 7/2022 Clouser

FOREIGN PATENT DOCUMENTS

EP 3670952 6/2020
EP 4166809 4/2023

OTHER PUBLICATIONS

Extended European Search Report for EP 24189141.5-1004, dated Dec. 2, 2024.

* cited by examiner

*Primary Examiner* — Robert A. Siconolfi
*Assistant Examiner* — Mahbubur Rashid
(74) *Attorney, Agent, or Firm* — Joseph M. Butscher; Carroll, Hoette & Butscher, LLC

(57) ABSTRACT

A no-back brake system for an actuator includes a ball ramp mechanism. A drag brake assembly is configured to be coupled to a first portion of the ball ramp mechanism. A main brake assembly is configured to be coupled to an actuator and a second portion of the ball ramp mechanism. A limited authority damper assembly is disposed between the drag brake assembly and the main brake assembly. The limited authority damper assembly includes an outer spacing ring configured to be coupled to the drive shaft of the actuator, an inner damping ring coupled to the outer spacing ring and the drag brake assembly, and a first spring disposed between the outer spacing ring and the inner damping ring.

20 Claims, 6 Drawing Sheets

NO-BACK BRAKE HAVING A LIMITED AUTHORITY DAMPER

FIELD OF THE DISCLOSURE

Examples of the present disclosure generally relate to no-back brakes of actuators used in relation to control surfaces of aircraft.

BACKGROUND OF THE DISCLOSURE

No-back brakes are used in various high lift flap and slat systems of aircraft to maintain surfaces at commanded positions. A typical no-back brake includes a drag brake assembly, a main brake assembly, and a ball ramp mechanism. The drag brake assembly and the main brake assembly are typically separated by a spacer that is configured to transmit axial force.

No-back brakes are used with respect to certain actuators to protect against back-driving during certain loading operations. However, known no-back brakes can be susceptible to chatter under such operating conditions. Chatter may cause vibration, audible noise, and relatively large torque oscillations, which may degrade performance and increase maintenance costs.

SUMMARY OF THE DISCLOSURE

A need exists for an improved no-back brake that is configured to eliminate, minimize, or otherwise reduce chatter. With that need in mind, certain examples of the present disclosure provide a no-back brake system for an actuator. The no-back brake system includes a ball ramp mechanism. A drag brake assembly is configured to be coupled to a first portion of the ball ramp mechanism. A main brake assembly is configured to be coupled to an actuator and a second portion of the ball ramp mechanism. A limited authority damper assembly is disposed between the drag brake assembly and the main brake assembly. The limited authority damper assembly includes an outer spacing ring configured to be coupled to a drive shaft of the actuator, an inner damping ring coupled to the outer spacing ring and the drag brake assembly, and a first spring disposed between the outer spacing ring and the inner damping ring.

In at least one example, the limited authority damper assembly further includes a second spring disposed between the outer spacing ring and the main brake assembly.

The actuator can be a geared rotary actuator configured to control movement of one or more control surfaces of an aircraft.

In at least one example, the drag brake assembly includes a first plurality of stators and a first plurality of rotors. The main brake assembly includes a second plurality of stators and a second plurality of rotors.

In at least one example, the outer spacing ring is configured to circumferentially extend around the drive shaft. In at least one example, the outer spacing ring includes a collar, and an extension wall extending away from an outer rim of the collar toward the drag brake assembly. The inner damping ring connects to the extension wall. The inner damping ring is inboard from the extension wall. The inner damping ring is spaced apart from and configured to circumferentially extend around the drive shaft. The collar can be axially offset from the inner damping ring by a space. The first spring can be disposed within the space.

In at least one example, the drag brake assembly includes one or more stators having a channel, and one or more rotors. A portion of the inner damping ring passes through the channel and abuts against the one or more rotors.

In at least one example, the limited authority damper assembly further includes a retaining ring that secures the inner damping ring to the outer spacing ring.

Certain examples of the present disclosure provide an actuator configured to control motion of one or more control surfaces of an aircraft. The actuator includes a drive shaft, and a no-back brake system coupled to the drive shaft, as described herein.

Certain examples of the present disclosure provide an aircraft including one or more control surfaces, and an actuator configured to control motion of the one or more control surfaces, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a no-back brake system including a preloaded, limited force damper configured to reduce undesired dynamic interaction, such as chatter.

Figure 1:
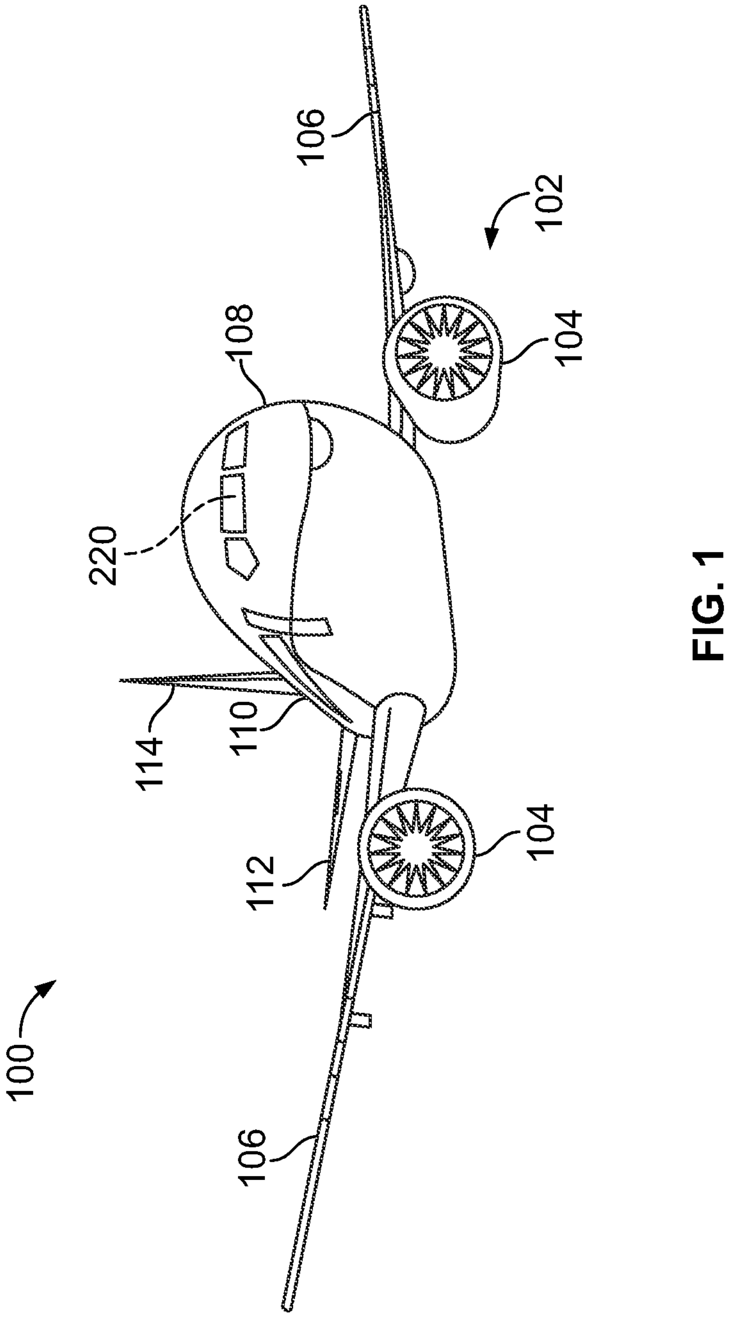
FIG. 1 illustrates a perspective front view of an aircraft, according to an example of the present disclosure.

FIG. 1 illustrates a perspective front view of an aircraft 100, according to an example of the present disclosure. The aircraft 100 includes a propulsion system 102 that includes engines 104, for example. Optionally, the propulsion system 102 may include more engines 104 than shown. The engines 104 are carried by wings 106 of the aircraft 100. In other examples, the engines 104 may be carried by a fuselage 108 and/or an empennage 110. The empennage 110 may also support horizontal stabilizers 112 and a vertical stabilizer 114. The fuselage 108 of the aircraft 100 defines an internal cabin 120, which includes a flight deck or cockpit, one or more work sections (for example, galleys, personnel carry-on baggage areas, and the like), one or more passenger sections (for example, first class, business class, and coach sections), one or more lavatories, and/or the like. FIG. 1 shows an example of an aircraft 100. It is to be understood that the aircraft 100 can be sized, shaped, and configured differently than shown in FIG. 1.

Figure 2:
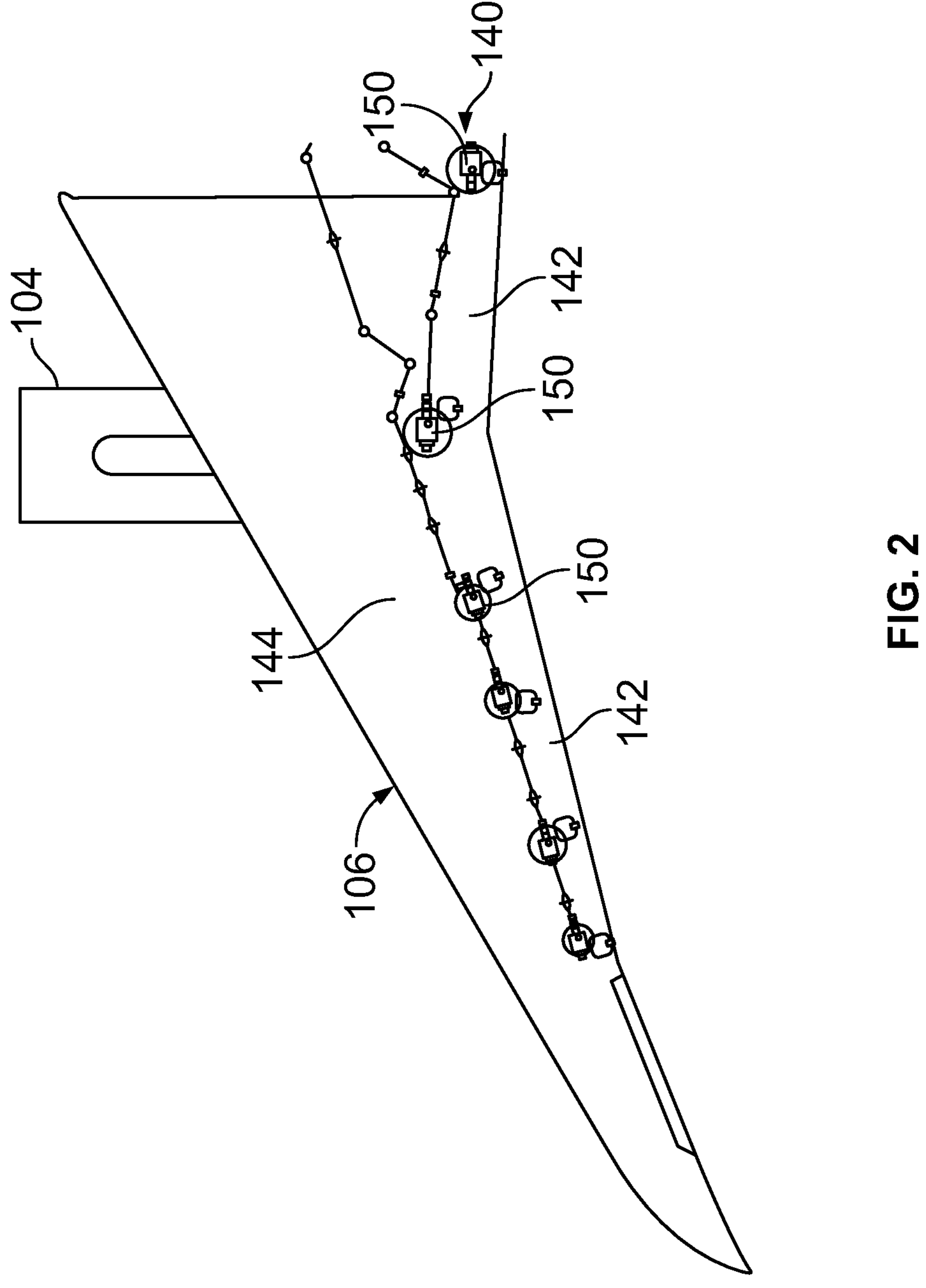
FIG. 2 illustrates a schematic diagram of a drive system for control surfaces of a wing, according to an example of the present disclosure.

FIG. 2 illustrates a schematic diagram of a drive system 140 for control surfaces of a wing 106, according to an example of the present disclosure. The control surfaces include flaps 142 that are coupled to a main body 144 of the wing 106. The drive system 140 is configured to control movement of the flaps 142 relative to the wing 106. Optionally, the drive system 140 can be used to control movement of other control surfaces of other portions of an aircraft.

The drive system 140 includes one or more actuators 150 that are configured to control motion of one or more flaps 142. In at least one example, the actuators 150 are geared rotary actuators. As described herein, the actuators 150 include no-back brake systems that are configured to maintain commanded positions of the flaps 142, slats, and/or the like.

Figure 3:
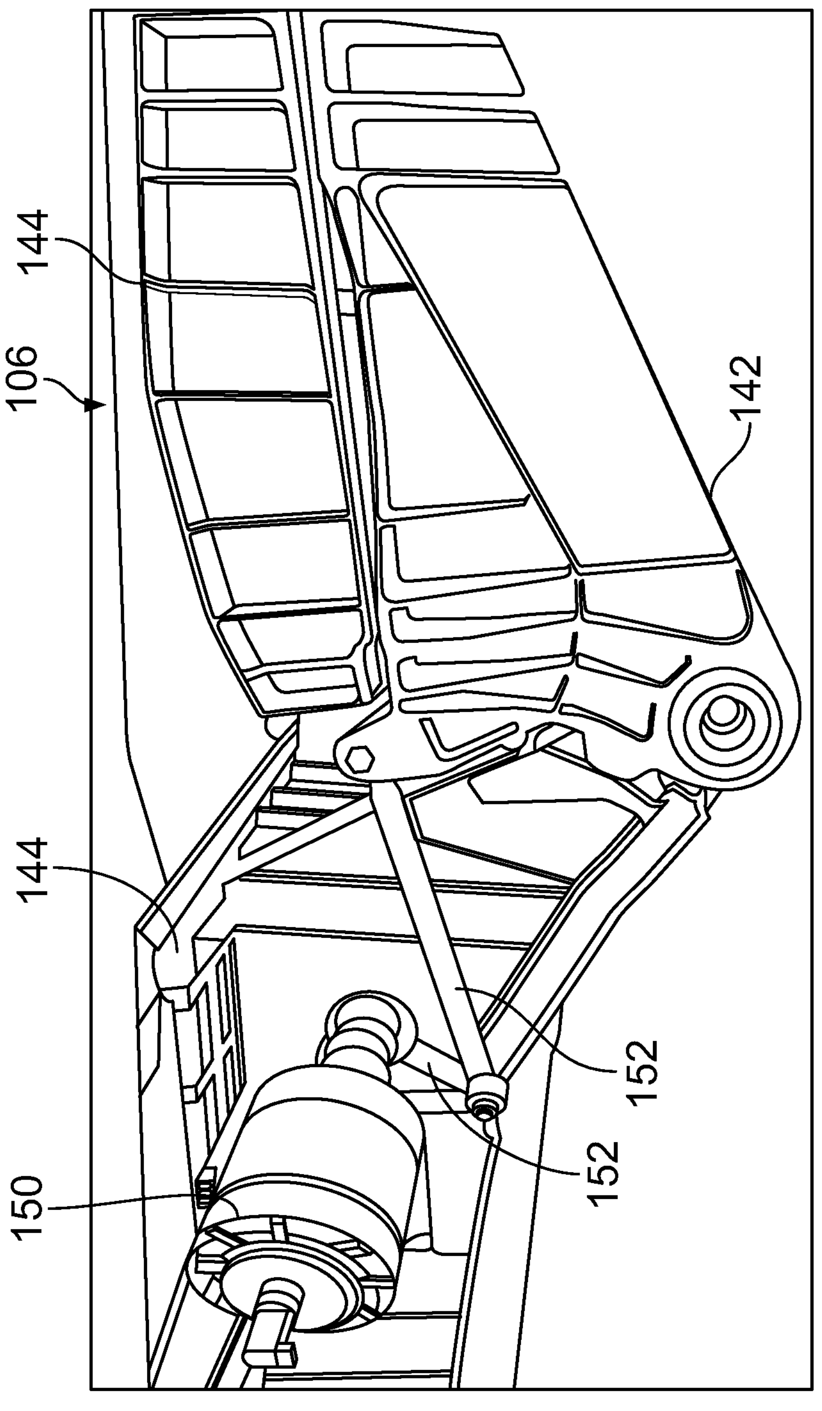
FIG. 3 illustrates a perspective internal view of a portion of a wing, according to an example of the present disclosure.

FIG. 3 illustrates a perspective internal view of a portion of a wing 106, according to an example of the present disclosure. The actuator 150, such as a geared rotary actuator, is secured to a portion of the main body 144 of the wing 106. The actuator 150 couples to the flap 142 through one or more linkages 152. As described herein, the actuator 150 includes a no-back brake system coupled to a drive shaft. It is to be understood that the arrangement shown in FIG. 3 is merely an example. The actuator 150 can couple to the flap 142 through different linkages than shown. Further, the main body 144 and the flap 142 can be sized and shaped differently than shown.

Figure 4:
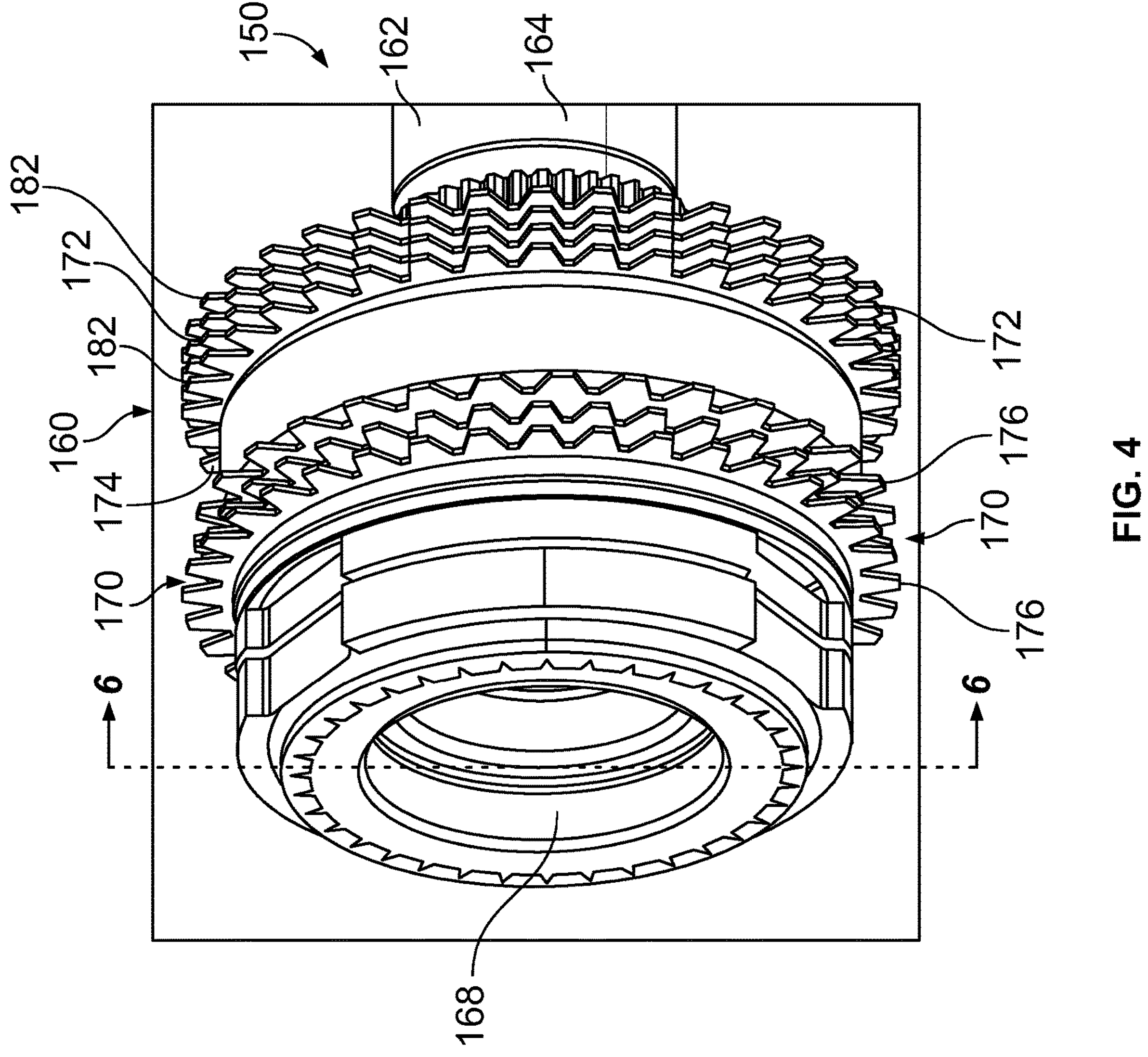
FIG. 4 illustrates a perspective view of a no-back brake system coupled to a drive shaft of an actuator, according to an example of the present disclosure.
Figure 5:
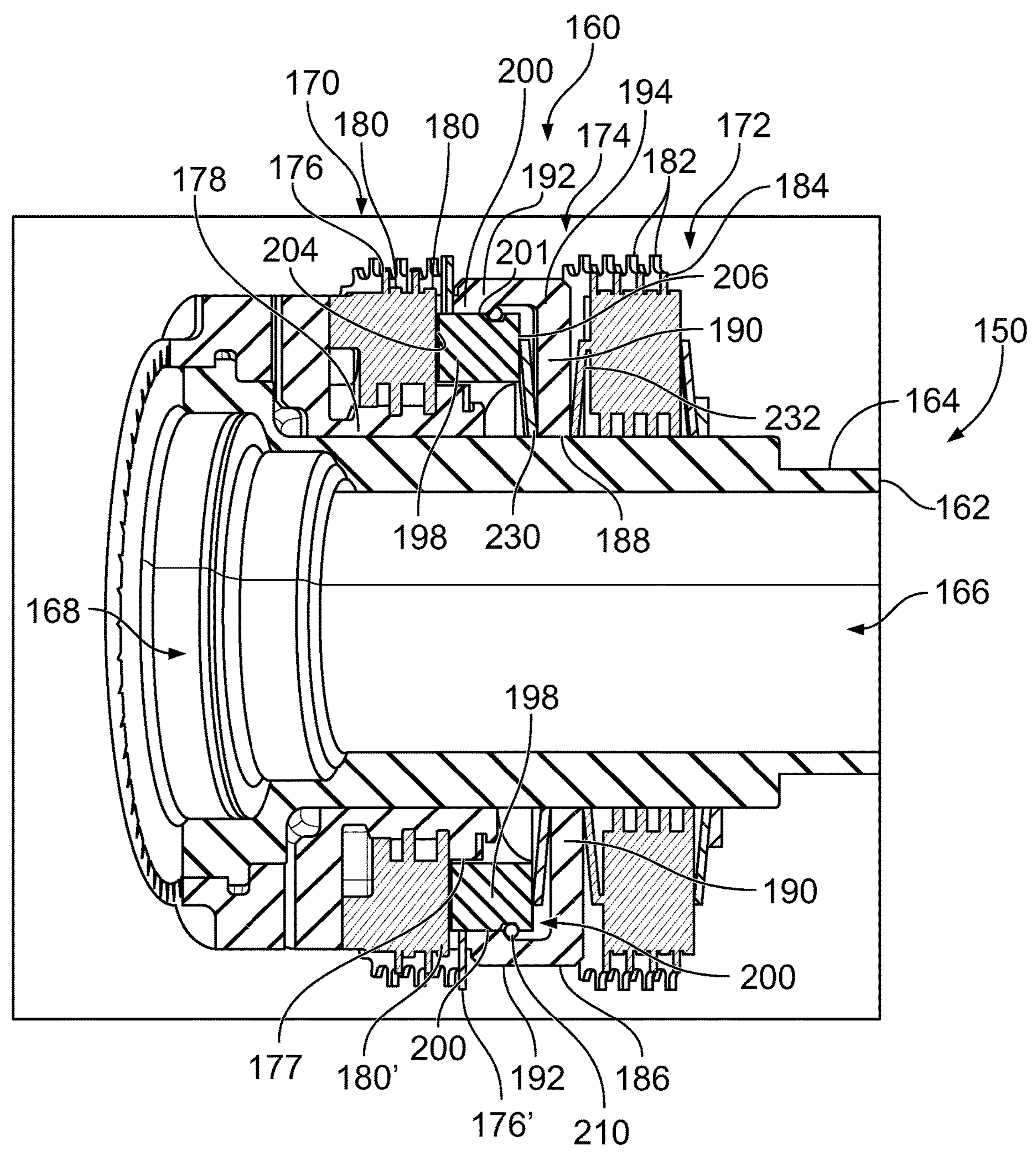
FIG. 5 illustrates a perspective transverse cross-sectional view of the no-back brake system coupled to the drive shaft of the actuator.
Figure 6:
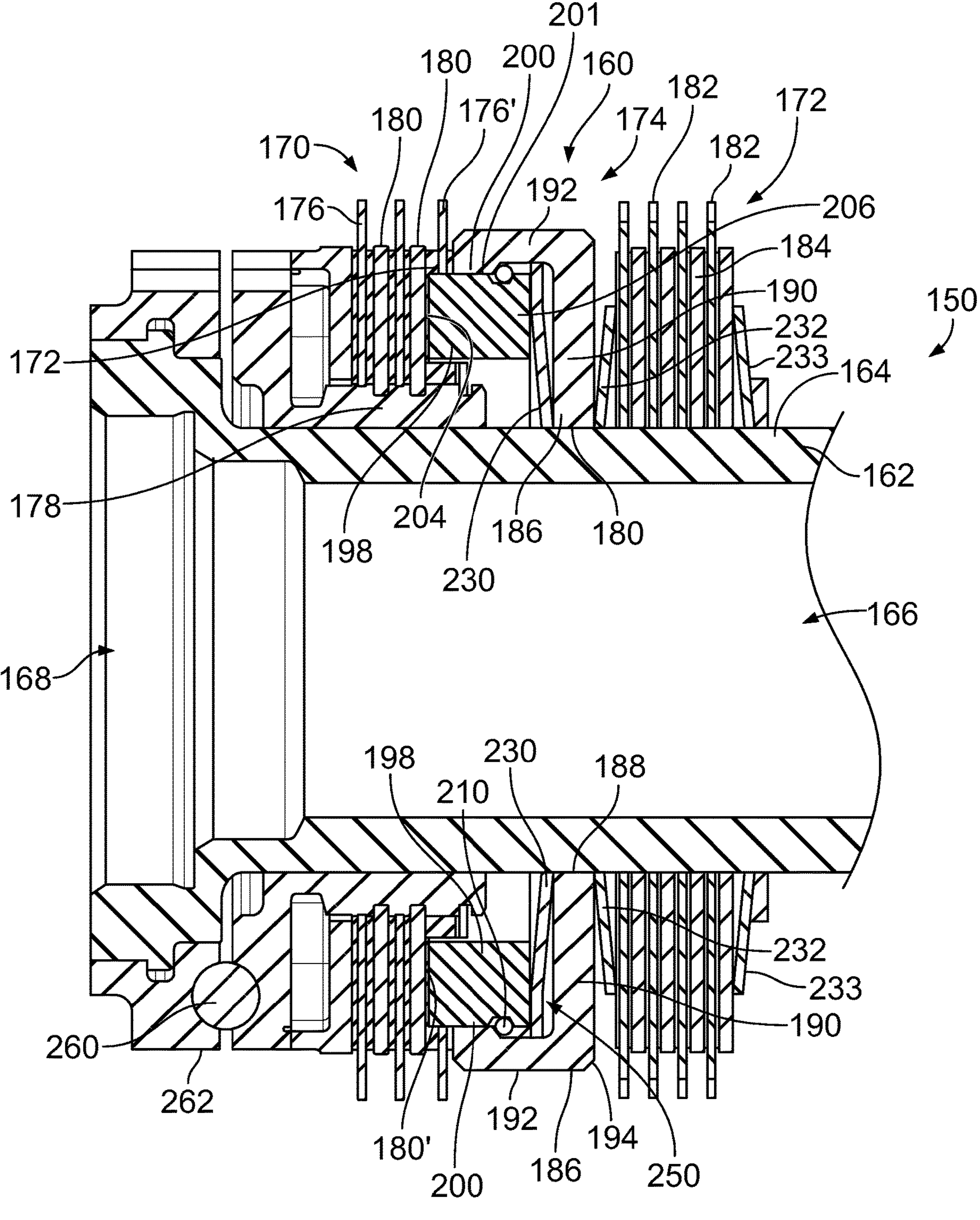
FIG. 6 illustrates a transverse cross-sectional view of the no-back brake system coupled to the drive shaft of the actuator through line 6-6 of FIG. 4.

FIG. 4 illustrates a perspective view of a no-back brake system 160 coupled to a drive shaft 162 of an actuator 150, according to an example of the present disclosure. FIG. 5 illustrates a perspective transverse cross-sectional view of the no-back brake system 160 coupled to the drive shaft 162 of the actuator 150. FIG. 6 illustrates a transverse cross-sectional view of the no-back brake system 160 coupled to the drive shaft 162 of the actuator 150 through line 6-6 of FIG. 4.

Referring to FIGS. 4-6, in at least one example, the actuator 150 is a geared rotary actuator. The drive shaft 162 includes an outer circumferential wall 164 defining a central passage 166 having an open end 168.

The no-back brake system 160 secures around the drive shaft 162. The no-back brake system 160 includes a drag brake assembly 170 separated from a main brake assembly 172 by a limited authority damper assembly 174. The drag brake assembly 170 is proximate to the open end 168 of the drive shaft 162, while the main brake assembly 172 is distal from the open end 168. The limited authority damper assembly 174 is disposed between the drag brake assembly 170 and the main brake assembly 172.

The drag brake assembly 170 includes a plurality of stators 176 splined into a ground path to an actuator housing, and a plurality of rotors 180 splined into the drive shaft 162. The drag brake assembly 170 can also include a ball ramp plate 178. The stators 176 and the rotors 180 circumferentially extend around the drive shaft 162.

The main brake assembly 172 includes a plurality of stators 182 splined into a ground, such as the actuator housing, and a plurality of rotors 184 coupled to the drive shaft 162. The stators 182 and the rotors 184 circumferentially extend around the drive shaft 162.

The limited authority damper assembly 174 includes an outer spacing ring 186 attached to the drive shaft 162 at a spline interface 188. The outer spacing ring 186 circumferentially extends around the drive shaft 162. The outer spacing ring 186 includes an annular collar 190 that radially extends away from the drive shaft 162. An annular extension wall 192 extends away from an outer rim 194 of the annular collar 190 toward the drag brake assembly 170. The outer spacing ring 186 can be formed of a metal, such as steel, aluminum, or the like. The outer spacing ring 186 acts as a parallel load path used to limit the torque the limited authority damper assembly 174 can transmit between the drag brake assembly 170 and the main brake assembly 172.

An inner damping ring 198 connects to an interior edge 200 of the extension wall 192, such as via a splined interface 201. The inner damping ring 198 is inboard (that is, closer to the drive shaft 162) from the extension wall 192, and circumferentially extends around the drive shaft 162, but is spaced apart from the drive shaft 162. The inner damping ring 198 can be formed of a metal, such as steel, aluminum, or the like.

The inner damping ring 198 has a first surface 204 opposite from a second surface 206. The first surface 204 abuts against or is other proximate to (such as within one inch or less) a portion of the drag brake assembly 170. In at least one example, an interior stator 176' of the drag brake assembly 170 includes a channel 177 through which the first surface 204 of the inner damping ring 198 passes, and abuts against an interior rotor 180' of the drag brake assembly 170. In at least one example, the first surface 204 of the inner damping ring 198 interfaces with the rotor 180' through a friction surface (such as a friction coating).

The collar 190 of the outer spacing ring 186 is axially offset from the inner damping ring 198 by a space 250, which allows for a specified axial motion of the inner damping ring 198, such as before a load path of the outer spacing ring 186 is engaged.

An annular retaining ring 210 can be used to secure the inner damping ring 198 to the outer spacing ring 186. Optionally, the limited authority damper assembly 174 may not include the retaining ring 210.

An annular first spring 230, such as an annular Belleville spring or resilient washer, is disposed between the second surface 206 of the inner damping ring 198 and the collar 190 of the outer spacing ring 186. For example, the first spring 230 is disposed within the space 250. The first spring 230 provides damping, and has a specified preload. The preloaded first spring 230 is selected to provide a desired amount of torque authority, and also provides a parallel load path when an applied axial load is below a predetermined design point. Optionally, the first spring 230 may not be preloaded. Additionally, more than one spring 230 can be used.

An annular second spring 232 (for example, a modulating spring), such as an annular Belleville spring or resilient washer, is disposed between the collar 190 of the outer spacing ring 186 and the main brake assembly 172. The second spring 232 provides damping of the brake sections, and can have a specified preload. Optionally, the second spring 232 is not preloaded. In at least one example, the second spring 232 is between the limited authority damper assembly 174 and the main brake assembly 172. An additional spring 233 (such as another modulating spring) can be disposed opposite from the second spring 232.

Optionally, the second spring 232 can be or otherwise include an arrangement of two or more annular springs installed in similar or different orientations, such as stacks in series, stacks in parallel, or progressive configurations. Optionally, the system may include the second spring 232.

Optionally, the spring 233 can be or otherwise include two or more annular springs installed in similar or different orientations, such as stacks in series, stacks in parallel, or progressive configurations. Optionally, the system may not include the spring 233.

A ball ramp mechanism 260 is disposed between a flange 262 of the drive shaft 162 and the drag brake assembly 170. The ball ramp mechanism 260 is configured to activate the main brake assembly 172 when an external load is applied. The main brake assembly 172 acts to hold moveable structure in place. The drag brake assembly 170 enables relative motion in the ball ramp mechanism 260 to engage the main brake assembly 172.

As described herein, the no-back brake system 160 for the actuator 150 includes the drag brake assembly 170 configured to be coupled to a portion of the ball ramp mechanism 162. The main brake assembly 172 is also configured to be coupled to the drive shaft 162 of the actuator 150. The limited authority damper assembly 174 is disposed between the drag brake assembly 170 and the main brake assembly 172. The limited authority damper assembly 174 includes the outer spacing ring 186 configured to be coupled to the drive shaft 162 of the actuator 150. The inner damping ring 198 is coupled to the outer spacing ring 186 and the drag brake assembly 170. The first spring 230 is disposed between the outer spacing ring 186 and the inner damping ring 198. In at least one example, the second spring 232 is disposed between the outer spacing ring 186 and the main brake assembly 172.

In operation, parallel load paths provided by the outer spacing ring 186 and the first spring 230 allow the limited authority damper assembly 174 to provide damping without latent unlocking of the drag brake section and main brake section. The damper torque can be used as a design point based on system needs, spring rates, and the like.

The limited authority damper assembly 174 creates an interaction between the main brake assembly 172 and the drag brake assembly 170. The outer spacing ring 186 is configured to provide a separate load path, thereby limiting the authority of, or torque developed by, the limited authority damper assembly 174. The first spring 230, the second spring 232 (and the spring 233), and spline connections provide characteristic design points that can be tuned for specific applications.

When opposing loads are applied, the limited authority damper assembly 174 is not engaged. In contrast, during aiding loads, a relative rotation is induced in the ball ramp mechanism 260 as output load is applied to the actuator 150. The relative rotation generates axial motion, which engages the inner damping ring 198, and the main brake assembly 172. The axial motion stops once a holding torque of the main brake assembly 172 equals the output load, thereby creating an equilibrium. As output load increases, the springs 232 and 233 compress based on axial force balance equations. Once the output load reaches a predetermined point, the outer spacing ring 186 engages, and transmits the remainder of the axial force. The damping force of the inner damping ring 198 can be limited to the force provided by the first spring 230 prior to the outer spacing ring 186 being engaged.

The limited authority damper assembly 174 operates to stabilize an undesirable dynamic interaction in no-back brakes called chatter, which is characterized by large torque oscillations on the driveline system, vibration, and loud audible noises. It has been found that the limited authority damper assembly 174 significantly reduces chatter. The limited authority damper assembly 174 also mitigates issues with performance and safety analyses.

Further, the disclosure comprises examples according to the following clauses:

Clause 1. A no-back brake system for an actuator, the no-back brake system comprising:
- a ball ramp mechanism;
- a drag brake assembly configured to be coupled to a first portion of the ball ramp mechanism;
- a main brake assembly configured to be coupled to an actuator and a second portion of the ball ramp mechanism; and
- a limited authority damper assembly disposed between the drag brake assembly and the main brake assembly, wherein the limited authority damper assembly comprises:
  - an outer spacing ring configured to be coupled to a drive shaft of the actuator;
  - an inner damping ring coupled to the outer spacing ring and the drag brake assembly; and
  - a first spring disposed between the outer spacing ring and the inner damping ring.

Clause 2. The no-back brake system of Clause 1, wherein the limited authority damper assembly further comprises a second spring disposed between the outer spacing ring and the main brake assembly.

Clause 3. The no-back brake system of Clauses 1 or 2, wherein the actuator is a geared rotary actuator configured to control movement of one or more control surfaces of an aircraft.

Clause 4. The no-back brake system of any of Clauses 1-3, wherein the drag brake assembly comprises a first plurality of stators and a first plurality of rotors, and wherein the main brake assembly comprises a second plurality of stators and a second plurality of rotors.

Clause 5. The no-back brake system of any of Clauses 1-4, wherein the outer spacing ring is configured to circumferentially extend around the drive shaft.

Clause 6. The no-back brake system of any of Clauses 1-5, wherein the outer spacing ring comprises:
- a collar; and
- an extension wall extending away from an outer rim of the collar toward the drag brake assembly.

Clause 7. The no-back brake system of Clause 6, wherein the inner damping ring connects to the extension wall.

Clause 8. The no-back brake system of Clauses 6 or 7, wherein the inner damping ring is inboard from the extension wall, and wherein the inner damping ring is spaced apart from and configured to circumferentially extend around the drive shaft.

Clause 9. The no-back brake system of any of Clauses 6-8, wherein the collar is axially offset from the inner damping ring by a space.

Clause 10. The no-back brake system of Clause 9, wherein the first spring is disposed within the space.

Clause 11. The no-back brake system of Clauses 1-10, wherein the drag brake assembly comprises:
- one or more stators having a channel; and
- one or more rotors,
- wherein a portion of the inner damping ring passes through the channel and abuts against the one or more rotors.

Clause 12. The no-back brake system of any of Clauses 1-11, wherein the limited authority damper assembly further comprises a retaining ring that secures the inner damping ring to the outer spacing ring.

Clause 13. An actuator configured to control motion of one or more control surfaces of an aircraft, the actuator comprising:

a drive shaft; and a no-back brake system coupled to the drive shaft, the no-back brake system comprising:

ball ramp mechanism;

a drag brake assembly coupled to a first portion of the ball ramp mechanism;

a main brake assembly coupled to the actuator and a second portion of the ball ramp mechanism; and limited authority damper assembly disposed between the drag brake assembly and the main brake assembly, wherein the limited authority damper assembly comprises:

an outer spacing ring coupled to the drive shaft of the actuator, wherein the outer spacing ring circumferentially extends around the drive shaft;

an inner damping ring coupled to the outer spacing ring and the drag brake assembly; and a first spring disposed between the outer spacing ring and the inner damping ring.

Clause 14. The actuator of Clause 13, wherein the limited authority damper assembly further comprises a second spring disposed between the outer spacing ring and the main brake assembly.

Clause 15. The actuator of Clauses 13 or 14, wherein the actuator is a geared rotary actuator.

Clause 16. The actuator of any of Clauses 13-15, wherein the outer spacing ring comprises:

a collar axially offset from the inner damping ring by a space, wherein the first spring is disposed within the space; and an extension wall extending away from an outer rim of the collar toward the drag brake assembly, wherein the inner damping ring connects to the extension wall, wherein the inner damping ring is inboard from the extension wall, and wherein the inner damping ring is spaced apart from and circumferentially extends around the drive shaft.

Clause 17. The actuator of any of Clauses 13-16, wherein the drag brake assembly comprises:

one or more stators having a channel; and one or more rotors, wherein a portion of the inner damping ring passes through the channel and abuts against the one or more rotors.

Clause 18. The actuator of any of Clauses 13-17, wherein the limited authority damper assembly further comprises a retaining ring that secures the inner damping ring to the outer spacing ring.

Clause 19. An aircraft comprising:

one or more control surfaces;

an actuator configured to control motion of the one or more control surfaces, the actuator comprising:

a drive shaft; and a no-back brake system coupled to the drive shaft, the no-back brake system comprising:

a ball ramp mechanism;

a drag brake assembly coupled to a first portion of the ball ramp mechanism, wherein the drag brake assembly includes one or more stators having a channel, and one or more rotors;

a main brake assembly coupled to the actuator and a second portion of the ball ramp mechanism; and a limited authority damper assembly disposed between the drag brake assembly and the main brake assembly, wherein the limited authority damper assembly comprises:

an outer spacing ring coupled to the drive shaft of the actuator, wherein the outer spacing ring circumferentially extends around the drive shaft;

an inner damping ring coupled to the outer spacing ring and the drag brake assembly, wherein a portion of the inner damping ring passes through the channel and abuts against the one or more rotors;

a first spring disposed between the outer spacing ring and the inner damping ring; and a second spring disposed between the outer spacing ring and the main brake assembly.

Clause 20. The aircraft of Clause 19, wherein the outer spacing ring comprises:

a collar axially offset from the inner damping ring by a space, wherein the first spring is disposed within the space; and an extension wall extending away from an outer rim of the collar toward the drag brake assembly, wherein the inner damping ring connects to the extension wall, wherein the inner damping ring is inboard from the extension wall, and wherein the inner damping ring is spaced apart from and circumferentially extends around the drive shaft.

As described herein, examples of the present disclosure provide improved no-back brake systems configured to eliminate, minimize, or otherwise reduce chatter.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A no-back brake system for an actuator, the no-back brake system comprising:
- a ball ramp mechanism;
- a drag brake assembly configured to be coupled to a first portion of the ball ramp mechanism;
- a main brake assembly configured to be coupled to an actuator and a second portion of the ball ramp mechanism; and
- a limited authority damper assembly disposed between the drag brake assembly and the main brake assembly, wherein the limited authority damper assembly comprises:
  - an outer spacing ring configured to be coupled to a drive shaft of the actuator, wherein the outer spacing ring comprises a collar, and an extension wall extending away from an outer rim of the collar toward the drag brake assembly;
  - an inner damping ring coupled to the outer spacing ring and the drag brake assembly; and
  - a first spring disposed between the outer spacing ring and the inner damping ring.

2. The no-back brake system of claim 1, wherein the limited authority damper assembly further comprises a second spring disposed between the outer spacing ring and the main brake assembly.

3. The no-back brake system of claim 1, wherein the actuator is a geared rotary actuator configured to control movement of one or more control surfaces of an aircraft.

4. The no-back brake system of claim 1, wherein the drag brake assembly comprises a first plurality of stators and a first plurality of rotors, and wherein the main brake assembly comprises a second plurality of stators and a second plurality of rotors.

5. The no-back brake system of claim 1, wherein the outer spacing ring is configured to circumferentially extend around the drive shaft.

6. The no-back brake system of claim 1, wherein the inner damping ring connects to the extension wall.

7. The no-back brake system of claim 1, wherein the inner damping ring is inboard from the extension wall, and wherein the inner damping ring is spaced apart from and configured to circumferentially extend around the drive shaft.

8. The no-back brake system of claim 1, wherein the collar is axially offset from the inner damping ring by a space.

9. The no-back brake system of claim 8, wherein the first spring is disposed within the space.

10. The no-back brake system of claim 1, wherein the drag brake assembly comprises:
- one or more stators having a channel; and
- one or more rotors,
- wherein a portion of the inner damping ring passes through the channel and abuts against the one or more rotors.

11. The no-back brake system of claim 1, wherein the limited authority damper assembly further comprises a retaining ring that secures the inner damping ring to the outer spacing ring.

12. An actuator configured to control motion of one or more control surfaces of an aircraft, the actuator comprising:
- a drive shaft; and
- a no-back brake system coupled to the drive shaft, the no-back brake system comprising:
  - a ball ramp mechanism;
  - a drag brake assembly coupled to a first portion of the ball ramp mechanism;
  - a main brake assembly coupled to the actuator and a second portion of the ball ramp mechanism; and
  - a limited authority damper assembly disposed between the drag brake assembly and the main brake assembly, wherein the limited authority damper assembly comprises:
    - an outer spacing ring coupled to the drive shaft of the actuator, wherein the outer spacing ring circumferentially extends around the drive shaft, wherein the outer spacing ring comprises a collar, and an extension wall extending away from an outer rim of the collar toward the drag brake assembly;
    - an inner damping ring coupled to the outer spacing ring and the drag brake assembly; and
    - a first spring disposed between the outer spacing ring and the inner damping ring.

13. The actuator of claim 12, wherein the limited authority damper assembly further comprises a second spring disposed between the outer spacing ring and the main brake assembly.

14. The actuator of claim 12, wherein the actuator is a geared rotary actuator.

15. The actuator of claim 12, wherein the
- collar is axially offset from the inner damping ring by a space, wherein the first spring is disposed within the space,
- wherein the inner damping ring connects to the extension wall, wherein the inner damping ring is inboard from the extension wall, and wherein the inner damping ring is spaced apart from and circumferentially extends around the drive shaft.

16. The actuator of claim 12, wherein the drag brake assembly comprises:
- one or more stators having a channel; and
- one or more rotors,
- wherein a portion of the inner damping ring passes through the channel and abuts against the one or more rotors.

17. The actuator of claim 12, wherein the limited authority damper assembly further comprises a retaining ring that secures the inner damping ring to the outer spacing ring.

18. An aircraft comprising:
- one or more control surfaces;
- an actuator configured to control motion of the one or more control surfaces, the actuator comprising:
  - a drive shaft; and a no-back brake system coupled to the drive shaft, the no-back brake system comprising:

a ball ramp mechanism;

a drag brake assembly coupled to a first portion of the ball ramp mechanism, wherein the drag brake assembly includes one or more stators having a channel, and one or more rotors;

a main brake assembly coupled to the actuator and a second portion of the ball ramp mechanism; and a limited authority damper assembly disposed between the drag brake assembly and the main brake assembly, wherein the limited authority damper assembly comprises:

an outer spacing ring coupled to the drive shaft of the actuator, wherein the outer spacing ring circumferentially extends around the drive shaft, wherein the outer spacing ring comprises a collar, and an extension wall extending away from an outer rim of the collar toward the drag brake assembly;

an inner damping ring coupled to the outer spacing ring and the drag brake assembly, wherein a portion of the inner damping ring passes through the channel and abuts against the one or more rotors;

a first spring disposed between the outer spacing ring and the inner damping ring; and a second spring disposed between the outer spacing ring and the main brake assembly.

19. The aircraft of claim 18, wherein the collar is axially offset from the inner damping ring by a space, wherein the first spring is disposed within the space, wherein the inner damping ring connects to the extension wall, wherein the inner damping ring is inboard from the extension wall, and wherein the inner damping ring is spaced apart from and circumferentially extends around the drive shaft.

20. The aircraft of claim 18, wherein the limited authority damper assembly further comprises a retaining ring that secures the inner damping ring to the outer spacing ring.

* * * * *